US009699876B2

(12) United States Patent
Vaschenko et al.

(10) Patent No.: US 9,699,876 B2
(45) Date of Patent: Jul. 4, 2017

(54) METHOD OF AND APPARATUS FOR SUPPLY AND RECOVERY OF TARGET MATERIAL

(71) Applicant: ASML NETHERLANDS B.V., Veldhoven (NL)

(72) Inventors: Georgiy Vaschenko, San Diego, CA (US); Peter Baumgart, San Diego, CA (US); Jeffrey Gacutan, San Diego, CA (US); Martin Algots, San Diego, CA (US); Theodosios Syrpis, San Diego, CA (US); Chirag Rajyaguru, San Diego, CA (US); Sanjeev Seshagiri, San Diego, CA (US)

(73) Assignee: ASML NETHERLANDS, B.V., Veldhoven (NL)

( * ) Notice: Subject to any disclaimer, the term of this patent is extended or adjusted under 35 U.S.C. 154(b) by 438 days.

(21) Appl. No.: 14/151,600

(22) Filed: Jan. 9, 2014

(65) Prior Publication Data

US 2014/0261761 A1 Sep. 18, 2014

Related U.S. Application Data

(60) Provisional application No. 61/784,548, filed on Mar. 14, 2013.

(51) Int. Cl.
*G03B 27/42* (2006.01)
*G01K 5/00* (2006.01)
*H05G 2/00* (2006.01)

(52) U.S. Cl.
CPC ............ *H05G 2/006* (2013.01); *H05G 2/005* (2013.01); *H05G 2/008* (2013.01); *Y10T 137/6416* (2015.04)

(58) Field of Classification Search
CPC ........ H05G 2/005; H05G 2/006; H05G 2/003; H05G 2/001; G03F 7/70033; G03F 7/70041; G03F 7/70891; G03F 7/20; G03F 7/7005; G21K 5/00
See application file for complete search history.

(56) References Cited

U.S. PATENT DOCUMENTS

| | | | |
|---|---|---|---|
| 6,824,011 | B1 | 11/2004 | Woempner |
| 2006/0192155 | A1 | 8/2006 | Algots et al. |
| 2008/0048133 | A1 | 2/2008 | Bykanov et al. |
| 2009/0230326 | A1 | 9/2009 | Vaschenko et al. |
| 2011/0310365 | A1 | 12/2011 | Yabu et al. |

OTHER PUBLICATIONS

International Search Report for PCT/US2014/016965 dated Jun. 3, 2014.

*Primary Examiner* — Mesfin Asfaw
(74) *Attorney, Agent, or Firm* — Arent Fox LLP

(57) ABSTRACT

An EUV light source target material handling system is disclosed which may comprise a droplet generator having a target material reservoir in which the target material may be replenished while a nozzle portion of the droplet generator is maintained at temperature. Also disclosed is a system for selectively draining spent target material.

17 Claims, 10 Drawing Sheets

METHOD OF AND APPARATUS FOR SUPPLY AND RECOVERY OF TARGET MATERIAL

CROSS-REFERENCE TO RELATED APPLICATION

This application is based upon and claims the benefit of priority of the U.S. Patent Application No. 61/784,548, filed Mar. 14, 2013, the disclosure of the prior application of which is hereby incorporated in its entirety by reference.

FIELD

The present disclosure relates to supply and recovery of target material in an EUV system.

BACKGROUND

Extreme ultraviolet light, e.g., electromagnetic radiation having wavelengths of around 50 nm or less (also sometimes referred to as soft x-rays), and including light at a wavelength of about 13.5 nm, can be used in photolithography processes to produce extremely small features in substrates such as silicon wafers. Here and elsewhere herein the term light will be used even though it is understood that the radiation described using that term may not in the visible part of the spectrum.

Methods for generating EUV light include converting a target material from a liquid state into a plasma state. The target material preferably includes at least one element, e.g., xenon, lithium or tin, with one or more emission lines in the EUV range. In one such method, often termed laser produced plasma ("LPP"), the required plasma can be produced by using a laser beam to irradiate a target material having the required line-emitting element.

The target material may take many forms. It may be solid or a molten. If molten, it may be dispensed in several different ways such as in a continuous stream or as a stream of discrete droplets. As an example, the target material in much of the discussion which follows is molten tin which is dispensed as a stream of discrete droplets. It will be understood by one of ordinary skill in the art, however, that other forms of material and delivery modes may be used.

Thus, one LPP technique involves generating a stream of target material droplets and irradiating at least some of the droplets with laser light pulses. In more theoretical terms, LPP light sources generate EUV radiation by depositing laser energy into a target material having at least one EUV emitting element, such as xenon (Xe), tin (Sn), or lithium (Li), creating a highly ionized plasma with electron temperatures of several 10's of eV.

The energetic radiation generated during de-excitation and recombination of these ions is emitted from the plasma in all directions. In one common arrangement, a near-normal-incidence mirror (often termed a "collector mirror" or simply a "collector") is positioned to collect, direct (and in some arrangements, focus) the light to an intermediate location. The collected light may then be relayed from the intermediate location to a set of scanner optics and ultimately to a wafer.

The stream of droplets is generated by a droplet generator. The portion of the droplet generator that releases the droplets, sometimes referred to as the nozzle or the nozzle assembly, is located within the vacuum chamber. Considering the example of molten tin dispensed as a stream of discrete droplets, technical challenges arise in supplying target material to the droplet generator and in the recovery of the target material that is not vaporized. This is due in part to the fact that in operation the droplet generator must be maintained at a temperature above the melting point of the target material. It is also due to the fact that the interior of the droplet generator is maintained at pressure to expel the molten target material from the nozzle.

In general, it is possible to supply target material to the droplet generator by depressurizing and cooling the droplet generator, opening the droplet generator, loading solid target material into the droplet generator, closing the droplet generator, and repressurizing and heating the droplet generator. It can be appreciated that this method of supplying tin to the droplet generator can be quite time consuming and labor intensive. It also involves taking the droplet generator offline, resulting in significant downtime. This is especially troublesome when the design of the droplet generator is such that it must be reloaded frequently.

Also, it may be difficult to restart the droplet generator when the droplet generator is stopped and cooled down below the melting point of the target material. This is at least partly because the nozzle may have a very small orifice. Permitting the temperature of the nozzle to fall below the melting temperature of the target material may cause the target material in the nozzle to solidify. This may in turn cause or permit the formation of contaminant particles to form. These particles may precipitate out of the target material when the nozzle is reheated to re-melt the target material. Some particles may also be dislodged from surfaces upstream of the nozzle due to the effect of thermal contraction and expansion and associated mechanical stresses or by surface tension forces when the droplet generator is emptied. The particles can clog the nozzle thus making it difficult or impossible for the droplet generator to restart. Similarly, when the droplet generator runs out of target material, cooling the nozzle of the droplet generator can have a severe negative effect on nozzle integrity and can also make it difficult or impossible for droplet generator to restart.

Thus, cooling the entire droplet generator down to a temperature at which it can be handled safely and replenishing the target material may not always be a feasible method of reloading the droplet generator. Also, the necessity of replacing or repairing a droplet generator every time it needs to be shut down or the target material needs to be replenished results in significant downtime for the EUV light generation system and also limits the useful lifetime of the droplet generator.

Similar issues exist with respect to recovery of target material which is introduced into the chamber as droplets but which are not vaporized. This can occur, for example, in systems in which the droplet generator runs continuously and the generation of light is controlled by starting and stopping the laser which vaporizes the droplets.

Provision must be made for removing the unused target material from the vacuum chamber, preferably without breaking the vacuum in the vacuum chamber.

There is thus a need to supply the droplet generator with target material and remove unused target material that does not require excessive downtime. There is also a need to supply the droplet generator in a way that permits the droplet generator to restart reliably after a reload operation. It would also be advantageous to design a droplet generator which can be left in place and even remain in operation while it is being reloaded. There is also a need to be able to remove unvaporized target material quickly and efficiently.

SUMMARY

The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

In one aspect, there is provided an EUV light source target material handling system including a target material delivery system adapted to deliver target material to an irradiation region of an EUV light source, the target material delivery system including a target material reservoir, a conduit having a first portion in fluid communication with the target material reservoir, a nozzle in fluid communication with a second portion of the conduit, and a heater arranged to be capable of maintaining the nozzle and the second portion at a first temperature not less than a melting temperature of the target material in the nozzle and the second portion, wherein the conduit is adapted to be able to maintain a temperature differential such that the second portion may be maintained at the first temperature when a temperature of the first portion is at an ambient temperature substantially below the first temperature. The conduit may include a freeze valve. Also, the conduit may be made of a material having low thermal conductivity such as stainless steel. The conduit may be adapted to be able to maintain a temperature differential by making the conduit sufficiently long. The conduit may include a section between the first and the second portion made of a thermal insulating material.

In another aspect, there is provided an EUV light source target material handling system including a target material delivery system adapted to deliver target material to an irradiation region of an EUV light source and a target material supply system adapted to supply target material to the target material delivery system, the target material delivery system including a target material reservoir; a nozzle in fluid communication with the target material reservoir; and a heater arranged to be capable of maintaining the nozzle above a temperature sufficient to keep target material in the nozzle in liquid form. The target material supply system includes a repository for holding target material. The target material handling system further includes a target material transfer system interposed between the target material reservoir and the repository and adapted to selectively establish a pathway for transfer of the target material from the repository to the target material reservoir.

The target material transfer system may include a valve to selectively establish a pathway for transfer of the target material from the repository to the target material reservoir and to selectively isolate the repository from the droplet generator plasma source material reservoir. The repository is adapted to receive a quantity of target material in solid form, and the target material handling system may include a heater to cause solid target material in the repository to become liquid target material.

The target material transfer system may further include a heat actuated valve between the repository and the target material reservoir. The target material transfer system may also include a flexible line between the repository and the target material reservoir to permit the target material delivery system to be moved independently of the repository.

In another aspect, there is provided an EUV light source target material handling system including a target material delivery system adapted to deliver target material to an irradiation region of an EUV light source and a target material supply system adapted to supply target material to the target material delivery system. The target material delivery system includes a target material reservoir; a nozzle in fluid communication with the target material reservoir; and a heater arranged to be capable of maintaining the nozzle above a temperature sufficient to keep target material in the nozzle in liquid form. The target material supply system includes a first repository and a second repository for holding target material. The target material handling system also includes a target material transfer system interposed between the target material reservoir and the first repository and the second repository adapted to selectively establish a pathway for transfer of the target material from the first repository and the second repository to the target material reservoir.

The target material transfer system may include a valve to selectively establish a pathway for transfer of the target material from the first repository to the target material reservoir and to selectively isolate the first repository from the target material reservoir. The first repository may be adapted to receive a quantity of target material in solid form, and the target material handling system may include a heater to cause solid target material in the first repository to become liquid target material. The second repository may be adapted to receive a quantity of target material in solid form, and the target material handling system may include a heater to cause solid target material in the second repository to become liquid target material.

The first repository and second repository may be respectively adapted to receive a quantity of target material in solid form and the target material handling system may include a first heater to cause solid target material in the first repository to become liquid target material and a second heater to cause solid target material in the second repository to become liquid target material.

The target material handling system may be adapted to have a first state in which the first repository is in fluid communication with the target material reservoir and the second repository is not in fluid communication with the target material reservoir, and a second state in which the first repository is not in fluid communication with the target material reservoir and the second repository is in fluid communication with the target material reservoir.

The target material transfer system may also include heat actuated valve between the first repository and the target material reservoir and a heat actuated valve between the second repository and the droplet generator plasma source material reservoir. The target material transfer system may also include a flexible line between the first repository and the reservoir to permit the target material delivery system to be moved independently of the first repository. The target material transfer system may also include a flexible line between the second repository and the reservoir to permit the target material delivery system to be moved independently of the second repository.

In another aspect, there is provided an EUV light source target material handling system including a target material delivery system adapted to deliver target material to an irradiation region of an EUV light source and a target material supply system adapted to supply target material to the target material delivery system, the target material delivery system including a target material reservoir, a nozzle in fluid communication with the target material reservoir; and a heater arranged to be capable of maintaining the nozzle above a temperature sufficient to keep target material in the nozzle in liquid form. The target material supply system includes a repository for holding target material in the form of pellets, and the target material handling system further includes a target material transfer system interposed between the target material reservoir and the repository and adapted to selectively establish a pathway for transfer of the pellets from the repository to the target material reservoir.

The target material transfer system may include a valve to selectively establish a pathway for transfer of the target material from the repository to the target material reservoir and to selectively isolate the repository from the droplet generator plasma source material reservoir. The repository may include a dispensing mechanism for dispensing the pellets one at a time into the pathway. The dispensing mechanism may include an element with structure defining a plurality of apertures and wherein each of the apertures is dimensioned to receive one of the pellets. The dispensing mechanism may also include a mechanism mechanically coupled to the element so as to sequentially move each of the apertures from a first position wherein one of the apertures receives a pellet from the repository and a second position wherein the pellet is released into the pathway.

In another aspect, there is provided an EUV light source target material handling system including a target material delivery system adapted to deliver target material to an irradiation region of a vacuum chamber of an EUV light source and a target material recovery system in a wall of the vacuum chamber and arranged to receive spent target material that has passed through the irradiation region without being irradiated, the target material recovery system including a first port in fluid communication with an interior of the vacuum chamber and arranged to receive the spent target material, a second port in fluid communication with an exterior of the vacuum chamber, and a cavity between the first port and the second port for retaining spent target material. The system also includes a temperature controller for the cavity so as to cause the cavity to have a first temperature state in which solid spent target material in the cavity seals the first port from the second port, and a second temperature state in which liquid spent target material in the cavity flows from the first port and out the second port through the cavity.

DETAILED DESCRIPTION

Figure 1:
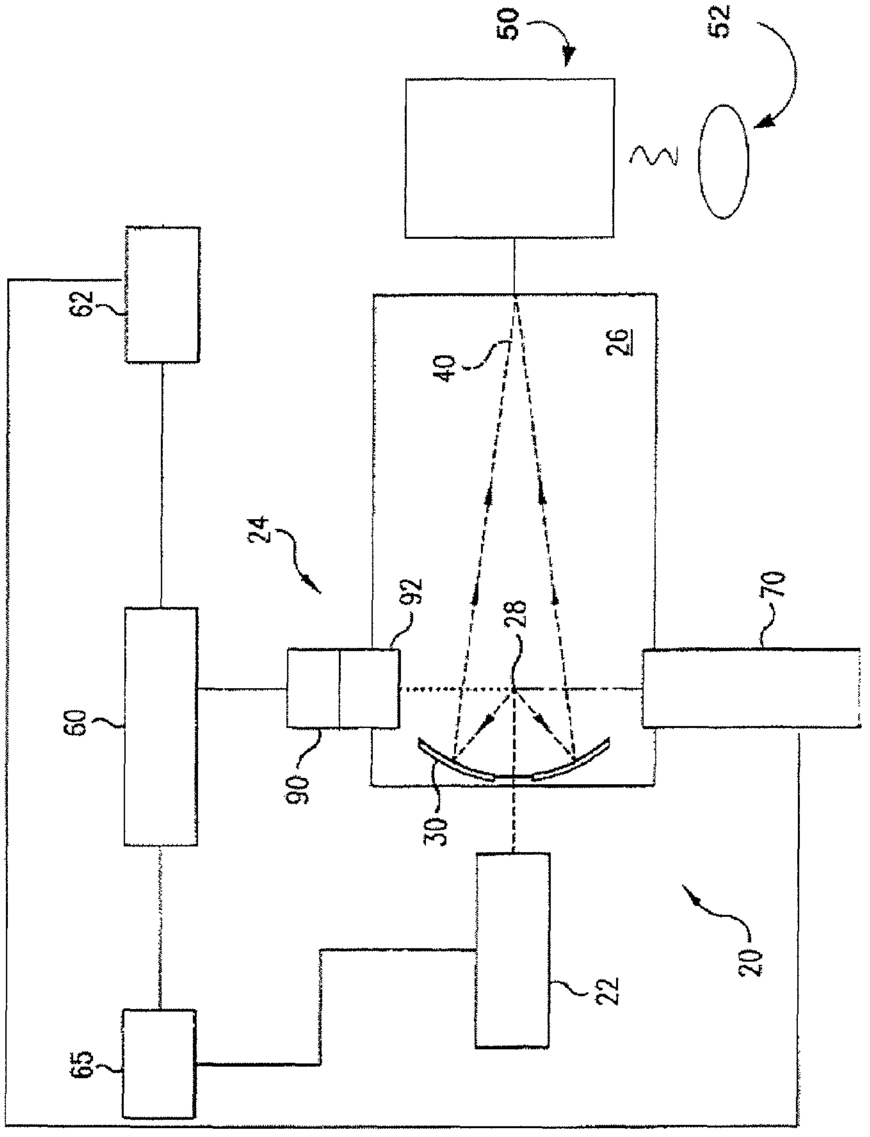
FIG. 1 shows a schematic, not to scale, view of an overall broad conception for a laser-produced plasma EUV light source system according to an aspect of the present invention.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments. The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

With initial reference to FIG. 1 there is shown a schematic view of an exemplary EUV light source, e.g., a laser produced plasma EUV light source 20 according to one aspect of an embodiment of the present invention. As shown, the EUV light source 20 may include a pulsed or continuous laser source 22, which may for example be a pulsed gas discharge $CO_2$ laser source producing radiation at 10.6 μm. The pulsed gas discharge $CO_2$ laser source may have DC or RF excitation operating at high power and high pulse repetition rate.

The EUV light source 20 also includes a target delivery system 24 for delivering target material in the form of liquid droplets or a continuous liquid stream. The target material may be made up of tin or a tin compound, although other materials could be used. The target delivery system 24 introduces the target material into the interior of a chamber 26 to an irradiation region 28 where the target material may be irradiated to produce plasma. In some cases, an electrical charge is placed on the target material to permit the target material to be steered toward or away from the irradiation region 28. It should be noted that as used herein an irradiation region is a region where target material irradiation may occur, and is an irradiation region even at times when no irradiation is actually occurring.

Continuing with FIG. 1, the light source 20 may also include one or more optical elements such as a collector 30. The collector 30 may be a normal incidence reflector, for example, implemented as a multilayer mirror or "MLM," that is, a SiC substrate coated with a Mo/Si multilayer with additional thin barrier layers deposited at each interface to effectively block thermally-induced interlayer diffusion. Other substrate materials, such as Al or Si, can also be used. The collector 30 may be in the form of a prolate ellipsoid, with an aperture to allow the laser light to pass through and reach the irradiation region 28. The collector 30 may be, e.g., in the shape of a ellipsoid that has a first focus at the irradiation region 28 and a second focus at a so-called intermediate point 40 (also called the intermediate focus) where the EUV light may be output from the EUV light source 20 and input to, e.g., an integrated circuit lithography tool 50 which uses the light, for example, to process a silicon wafer work piece 52 in a known manner. The silicon wafer work piece 52 is then additionally processed in a known manner to obtain an integrated circuit device.

The EUV light source 20 may also include an EUV light source controller system 60, which may also include a laser firing control system 65, along with, e.g., a laser beam positioning system (not shown). The EUV light source 20 may also include a target position detection system which may include one or more droplet imagers 70 that generate an output indicative of the absolute or relative position of a target droplet, e.g., relative to the irradiation region 28, and provide this output to a target position detection feedback system 62. The target position detection feedback system 62 may use this output to compute a target position and trajectory, from which a target error can be computed. The target error can be computed on a droplet-by-droplet basis, or on average, or on some other basis. The target error may then be provided as an input to the light source controller 60. In response, the light source controller 60 can generate a control signal such as a laser position, direction, or timing correction signal and provide this control signal to a laser beam positioning controller (not shown). The laser beam positioning system can use the control signal to control the laser timing circuit and/or to control a laser beam position and shaping system (not shown), e.g., to change the location and/or focal power of the laser beam focal spot within the chamber.

As shown in FIG. 1, the light source 20 may include a target delivery control system 90. The target delivery control system 90 is operable in response to a signal, for example, the target error described above, or some quantity derived from the target error provided by the system controller 60, to correct for errors in positions of the target droplets within the irradiation region 28. This may be accomplished, for example, by repositioning the point at which the target delivery mechanism 92 releases the target droplets. The target delivery mechanism 92 extends into the chamber 26 and is also externally supplied with target material and a gas source to place the target material in the target delivery mechanism 92 under pressure.

Figure 2:
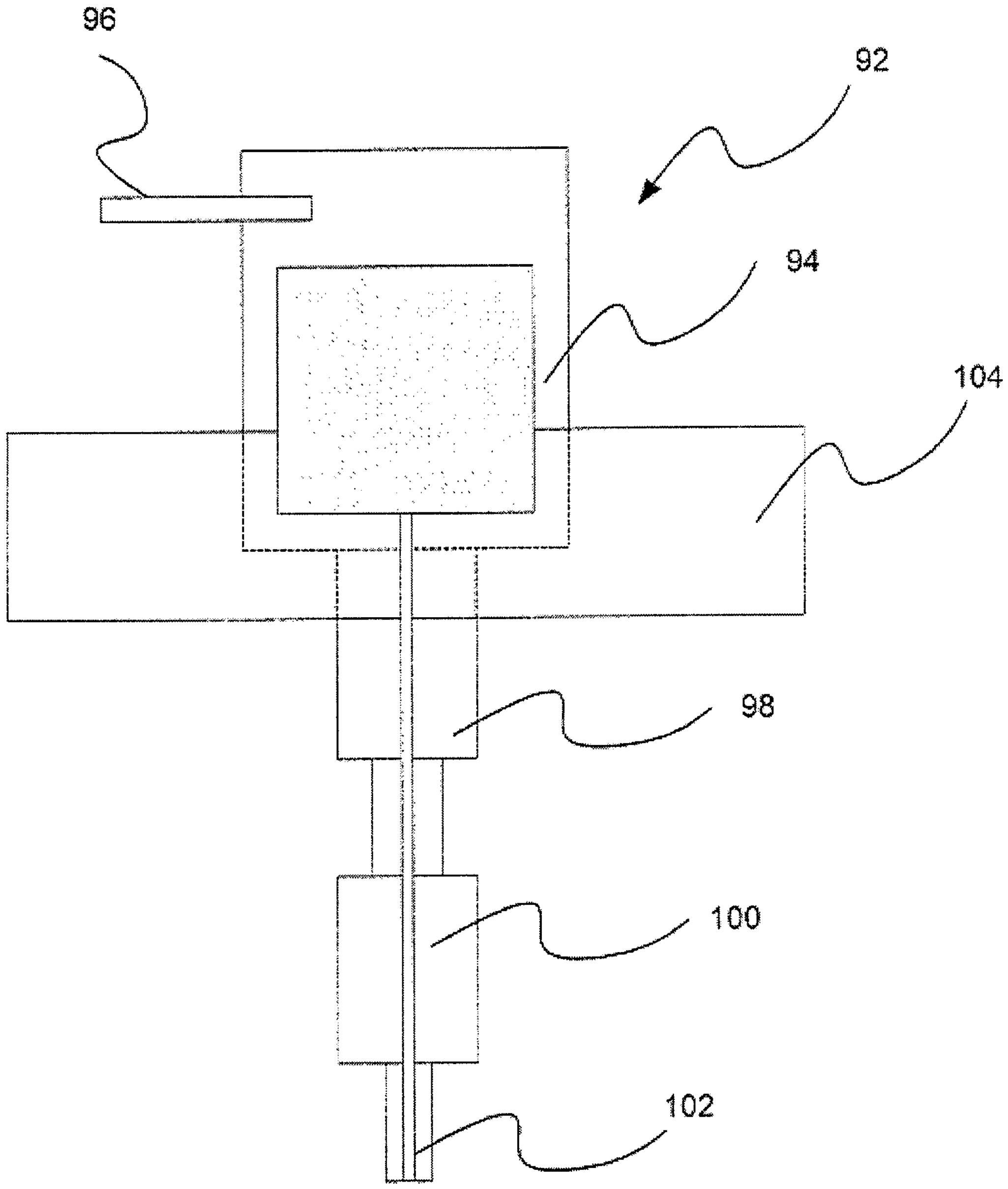
FIG. 2 is a plan view of a droplet dispenser.

FIG. 2 shows in greater detail a target delivery mechanism 92 for delivering target material into the chamber 26. For the generalized embodiment shown in FIG. 2, the target delivery mechanism 92 may include a reservoir 94 holding a molten target material such as tin. Heating elements (not shown) controllably maintain the target delivery mechanism 92 or selected sections thereof at a temperature above the melting temperature of the target material. The molten target material may be placed under pressure by using an inert gas such as argon introduced through a feed line 96. The pressure preferably forces the target material to pass through a set of filters 98. From the filters 98, the material may pass through a valve 100 to a nozzle 102. For example valve 100 may be a thermal valve. A Peltier device may be employed to establish the valve 100, freezing target material between the filters 98 and nozzle 102 to close the valve 100 and heating the solidified target material to open the valve 100. FIG. 2 also shows that the target delivery system 92 is coupled to a movable member 174 such that motion of the movable member 104 changes the position of the point at which droplets are released from the nozzle 102. Motion of the movable member 104 is controlled by a droplet release point positioning system, as described in co-pending U.S. patent application Ser. No. 13/328,628, assigned to Cymer Inc., the entirety of which is hereby incorporated by reference herein.

For the target delivery mechanism 92, one or more modulating or non-modulating target material dispensers may be used. For example, a modulating dispenser may be used having a capillary tube formed with an orifice. The nozzle 102 may include one or more electro-actuatable elements, e.g. actuators made of a piezoelectric material, which can be selectively expanded or contracted to deform the capillary tube and modulate a release of source material from the nozzle 102. Examples of modulating droplet dispensers can be found in U.S. Pat. No. 7,838,854, from application Ser. No. 11/067,124 filed on Feb. 25, 2005, entitled METHOD AND APPARATUS FOR EUV PLASMA SOURCE TARGET DELIVERY, U.S. Pat. No. 7,589,337 from application Ser. No. 12/075,631 filed on Mar. 12, 2008, entitled LPP EUV PLASMA SOURCE MATERIAL TARGET DELIVERY SYSTEM, U.S. patent application Ser. No. 11/358,983 filed on Feb. 21, 2006, and entitled, SOURCE MATERIAL DISPENSER FOR EUV LIGHT SOURCE, the entire contents of each of which are hereby incorporated by reference herein. An example of non-modulating droplet dispenser can be found in co-pending U.S. patent application Ser. No. 11/358,988 filed on Feb. 21, 2006, and entitled, LASER PRODUCED PLASMA EUV LIGHT SOURCE WITH PRE-PULSE, the entire contents of each of which are hereby incorporated by reference herein.

Figure 3:
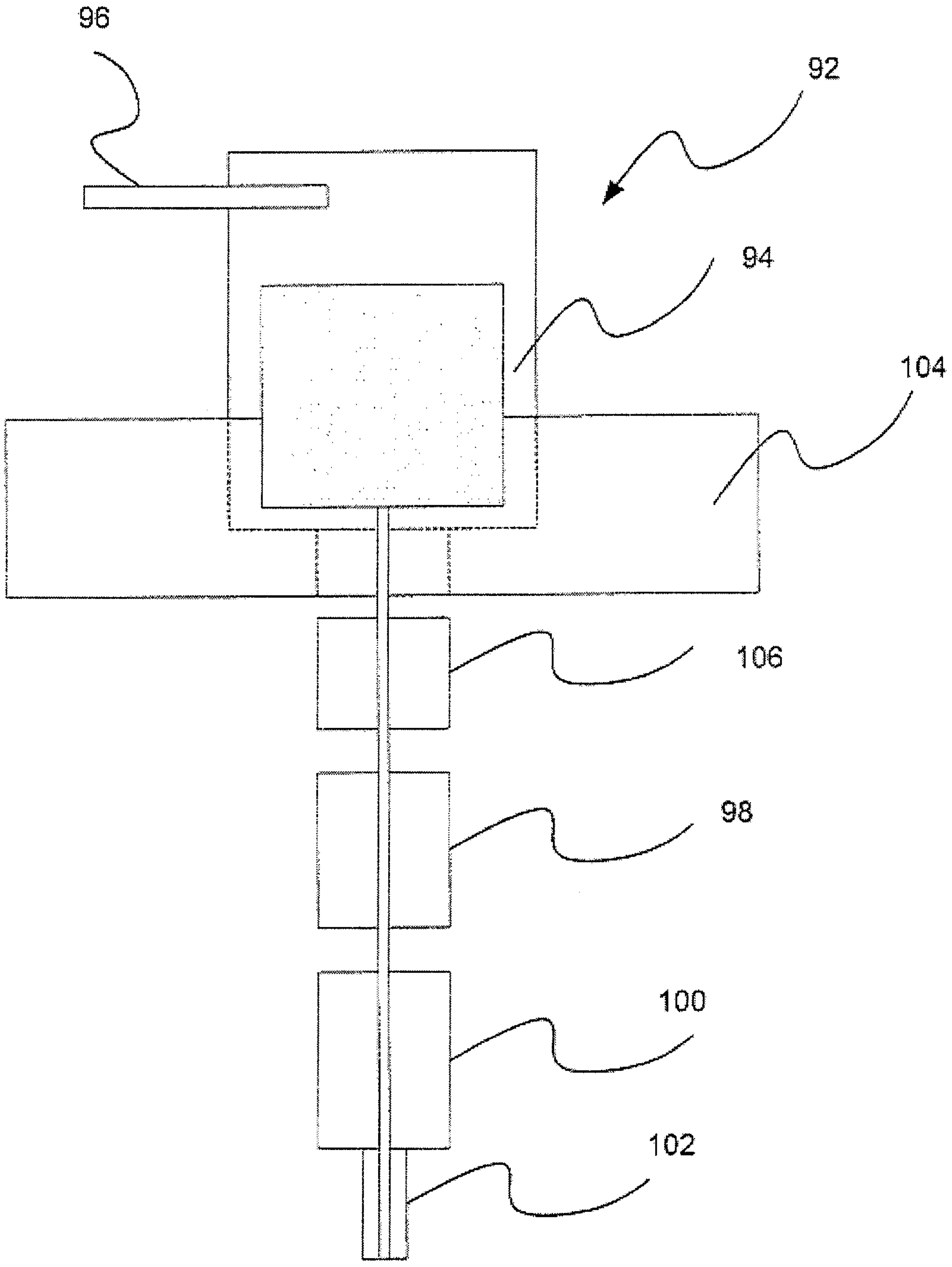
FIG. 3 is a plan view of a droplet dispenser according another aspect of the present invention.

According to one aspect of the invention, as shown in FIG. 3, a method of reloading target material in a droplet generator involves cooling down only a first section of the droplet generator, that is, at least the section including at least the reservoir 94, while keeping a second section of the droplet generator, that is, the section including at least the nozzle assembly 102, at a temperature above the melting point of the target material. Thus, the nozzle assembly 102 is maintained at a condition in which particles are not formed or launched. This increases the likelihood that the droplet generator can be restarted successfully.

At the same time, the temperature of the reservoir 94 is caused or permitted to decrease by turning off heaters that would otherwise maintain the temperature of the reservoir 94 above the melting point of the target material. Alternatively, forced cooling of the reservoir 94 could be used. This means that the reservoir 94 can be cooled to a temperature at which the target material in the reservoir 94 undergoes a transition from liquid to solid and the reservoir can be safely handled, i.e., opened and loaded with a new portion of the solid target material.

Following the reload the droplet generator reservoir 94 may be heated to a temperature above the melting point of the target material and the droplet generator 92 can be restarted in a short amount of time using the same nozzle assembly. The target material reservoir 94 and nozzle assembly 92 may each have its own set of heaters that can be controlled independently of one another.

In implementing a system such as that shown in FIG. 3, it is preferable to take measures to ensure that the droplet generator 92 has sufficiently low thermal conductivity between the nozzle assembly 102 and the reservoir 94 so that the temperature of the reservoir 94 can be reduced substantially below the melting point of the target material, that is, in the range of about 20 to about 230 degrees centigrade for tin, while the temperature of the nozzle assembly 102 can be maintained above that value, that is, in the range of about 240 to about 270° C. This can be accomplished by selecting materials connecting these two elements of the droplet generator 92 that have low heat conduction. Stainless steel is an example of such a material. This can also be accomplished by reducing the cross section and increasing the length of the section of the droplet generator that connects the reservoir 94 and the nozzle assembly 102. The increased length of connecting section may include a connecting block 106 as shown in FIG. 3. The connecting block 106 may be placed upstream of the filters 98 and valve 100 as shown, or at some other location upstream of the nozzle 102.

According to another aspect of the invention, the valve 100 may be eliminated and a portion of the tube 108 that connects the reservoir 94 and the nozzle assembly 102 may serve as a valve that protects target material that remains in the molten state inside of the nozzle assembly 102 from exposure to air that can be introduced into the reservoir 94 during reload. Exposure of target material in the molten state to air may result in rapid oxidation of the target material, and intake of oxygen into the target material in a dangerously high concentration (resulting in formation of oxide particles). Using part of tube 108 as a valve also protects the vacuum inside of the EUV chamber 26 and prevents target material from flowing through the nozzle 102 under the effect of atmospheric pressure.

In order to achieve reliable valve action the tube 108 preferably has a small inner diameter. In a presently preferred embodiment the diameter is in the range of approximately 0.5-2.0 millimeters. Also, the tube 108 is preferably made of a material with reasonably good wetting of the surface by the target material. For example, if the target material is tin, then the tube 108 may be made of molybdenum.

Also, the droplet generator 92 is preferably designed so that temperature gradients in the components making up the droplet generator 92 result in stress forces that are safely below the tensile strength of the materials used to make the components.

Figure 4:
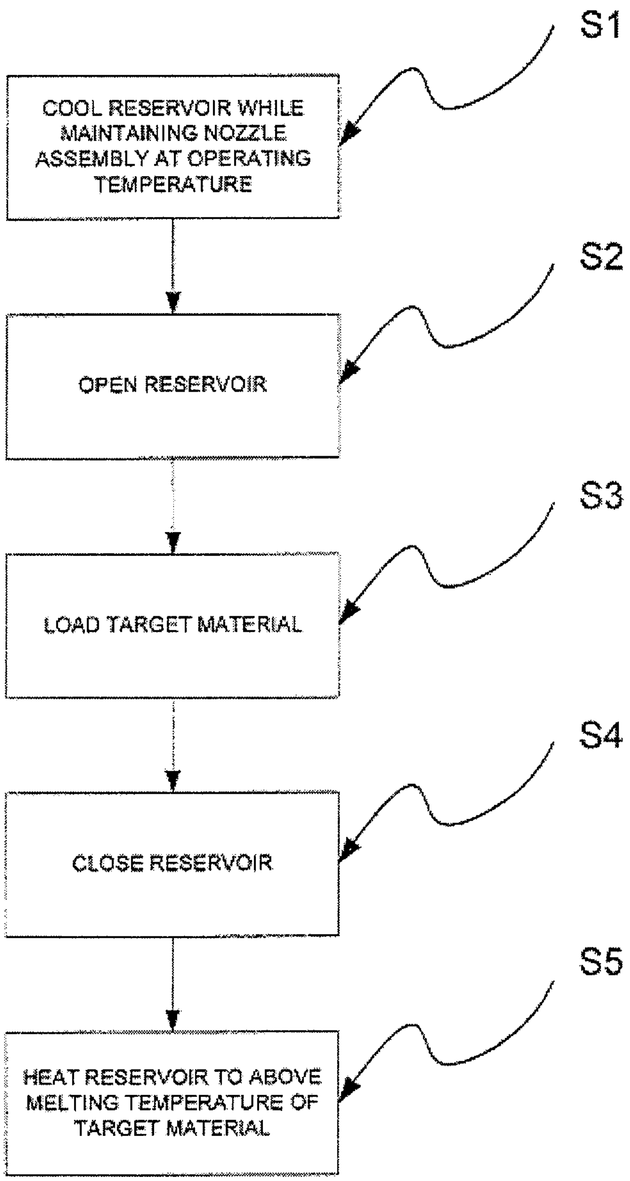
FIG. 4 is flow chart showing the steps of a loading a droplet generator such as that shown in FIG. 3.

With reference now to FIG. 4, the steps for loading target material in an arrangement such as that shown in FIG. 3 can be as follows. After the droplet generator 92 is depressurized, the temperature of reservoir 94 is decreased in a step Si down to the point where it can be safely handled while maintaining the nozzle assembly 102 at a temperature sufficiently high to keep the target material within it molten. The reservoir 94 then is opened in a step S2 and solid target material placed inside of the reservoir 94 in a step S3. The reservoir 94 is then closed in a step S4 and heated in a step S5 to a temperature above the melting temperature of tin. The droplet generator 92 is then repressurized.

Figure 5:
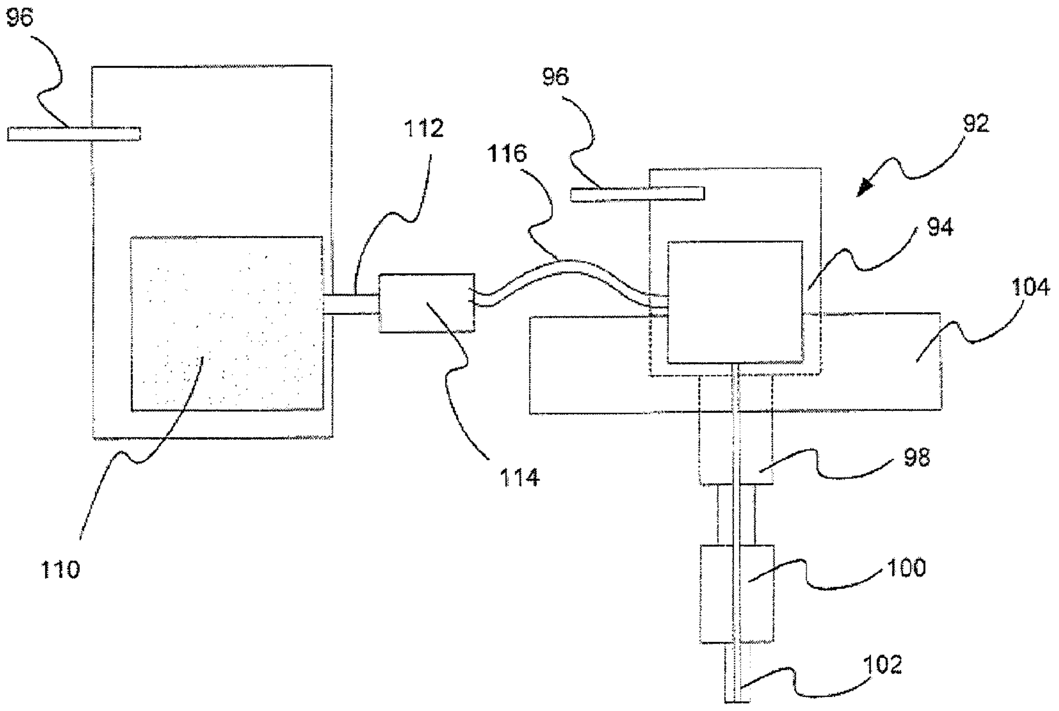
FIG. 5 is a plan view of a droplet dispenser according to another aspect of the present invention.

The above system has the advantage that it avoids the necessity of having to cool and then re-heat the nozzle assembly 102. It has the disadvantage, however, of requiring taking the droplet generator 92 out of operation to reload it. It is preferable to have a system which permits the droplet generator 92 to operate essentially continuously, even while its supply of target material is being replenished. Such an arrangement is shown in FIG. 5. The reservoir 92 may be coupled to an external reservoir 110 using a pipe 112 having a valve 114. Here and elsewhere herein, "external" means external to the droplet generator 92. The valve 114 may be a freeze valve. Such an arrangement is shown in U.S. Pat. No. 7,122,816, assigned to Cymer Inc., the entirety of which is hereby incorporated by reference herein. In such a system, the operator may fill the external reservoir 110 by closing the valve 114, depressurizing and cooling the external reservoir 110, opening the external reservoir 110 and adding solid target material, closing the external reservoir 110, and heating the target material in the external reservoir 110 to cause it to liquefy. The operator may then put the external reservoir 110 in fluid communication with the droplet generator reservoir 94 by opening the valve 114 and to cause the molten target material to flow to the reservoir 94. Periodic refilling of the external reservoir 110 is required, e.g., when a low level is detected by a level detector in the droplet generator reservoir 94 but can be done while droplet generator 92 is operational thus saving time.

In the arrangement shown in FIG. 5, the droplet generator 92 is connected to the external reservoir 110 by a flexible heated line 116. This permits the droplet generator 92 to be moved substantially independently of the droplet generator 92. Because the system moving the movable member 104 does not have to move the mass of the external reservoir 110, repeatable and controllable positioning of the droplet generator 92 is simplified. The external reservoir may have a larger target material capacity than the droplet generator. This also reduces the mass of the target material which the system coupled to the movable member must manipulate.

Figure 6:
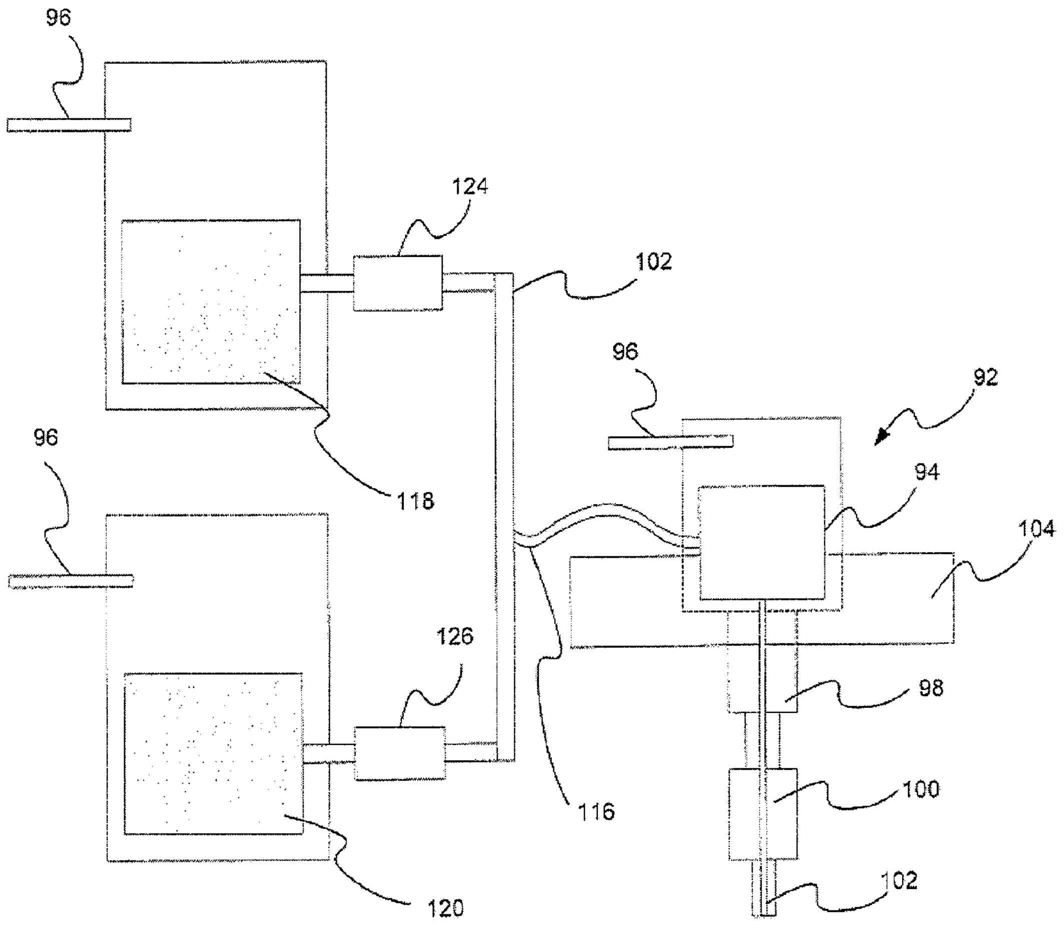
FIG. 6 is a plan view of a droplet dispenser according to another aspect of the present invention.

According to another aspect of the invention, as shown in FIG. 6, a first external reservoir 118 and a second external reservoir 120 are provided. The external reservoir 118 is connected to a common line 122 by a first valve 124. The external reservoir 120 is connected to the common line 122 by a second valve 126. The common line 122 is connected to the droplet generator 92 by a heated flexible line 116. The valves 124, 126 are preferably freeze valves that essentially are open when they are hot enough to melt the target material and closed when they are too cold to melt the target material.

The volume of the droplet generator reservoir 94 is preferably smaller than the volume of the external reservoirs 118, 120 to minimize the mass of the droplet generator 92 for the reasons stated above.

Figure 7:
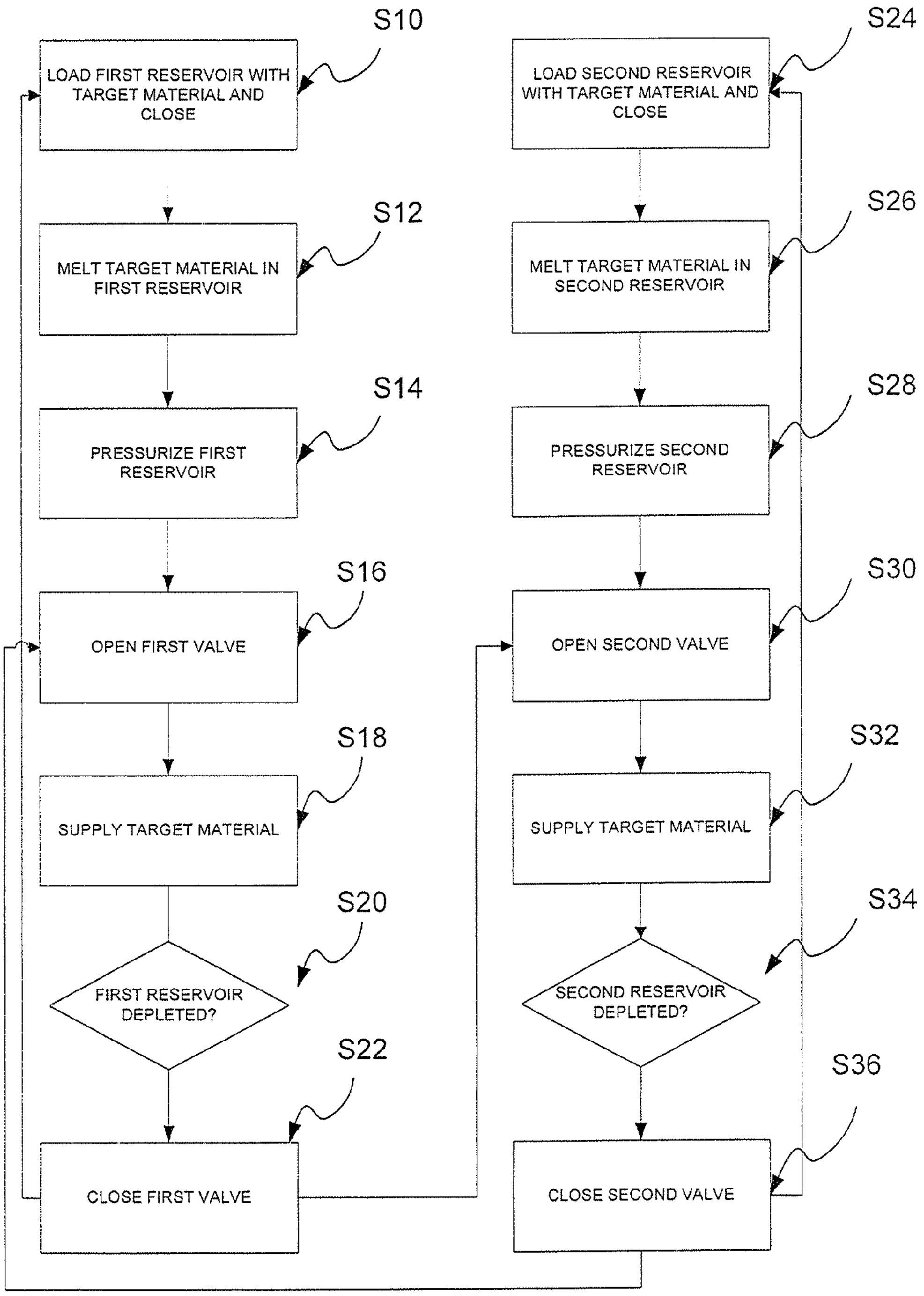
FIG. 7 is flow chart showing the steps of a loading a droplet generator such as that shown in FIG. 6.

With reference now to FIG. 7, the steps for loading target material in an arrangement such as that shown in FIG. 6 can be as follows. Initially, at least the first external reservoir 118 is loaded with target material and closed in a step S10. Then the target material in first external reservoir 118 is melted in a step S12. The first external reservoir 118 is then pressurized in a step S14. The first valve 124 is then opened in a step S16. In steps as 18 and S20 the target material is supplied until the first external reservoir 118 is depleted. It will be understood here and elsewhere that depleted in this context means that the amount of target material in the first external reservoir 118 has fallen below a predetermined threshold.

While the steps described immediately above are being carried out, the second external reservoir 120 is loaded with target material, heated, and pressurized in steps S24, S26, and S28. It will be understood that the steps may be carried out any time before the target material in the first external reservoir 118 is depleted. When this occurs, then in step S22 the first valve is closed and in step S30 the second valve is opened to connect the second external reservoir 120 to the droplet generator reservoir 94. While the steps just described are being carried out, the first external reservoir 118 is loaded with target material, heated, and pressurized in steps S10, 12 and 14. It will be understood that the steps may be carried out any time before the target material in the second external reservoir 120 is depleted. When this occurs, then in step S30 the first valve is closed and in step S30 the second valve is opened to connect the first external reservoir 120 to the droplet generator reservoir 94. The second internal reservoir 120 is then refilled as described above, with the steps being timed and sequenced so that the second internal reservoir 120 is ready to start supplying molten target material to the droplet generator reservoir 94, with this sequencing being continued indefinitely. In this manner that droplet generator 92 can be supplied with a nearly inexhaustible supply of target material and can be operated continuously without the need for downtime to refill it.

As an example, in the continuous refill method described above there is a reservoir 94 in the droplet generator that preferably has a smaller volume than the first and second external reservoirs 118, 120. For example, the volume of the droplet generator reservoir 94 could be in the range of about 50 cubic centimeters to about 150 cubic centimeters. The volume of the larger first and second external reservoirs 118, 120 could be, for example, could be in the range of about 200 cubic centimeters to about 400 cubic centimeters each.

In this arrangement, the external reservoir currently supplying target material to the droplet generator reservoir 94 is kept at a pressure slightly higher than the pressure in the droplet generator 92 to allow continuous fill of the droplet generator reservoir 94. Once the first external reservoir 118 is depleted, the valves 124, 126 are sequenced to switch over to the second external reservoir 120. At the same time, the first external reservoir 118 is isolated from the droplet generator 92, cooled down, and loaded with solid target material. The first external reservoir 118 is then heated kept ready to supply target material to the droplet generator 92. In this method, cycling time is not an issue because the supply of target material to the droplet generator 92 can be essentially continuous. This method also allows the use of a low mass droplet generator 92 with a potential for using higher pressures and faster and more accurate steering.

Figure 8A:
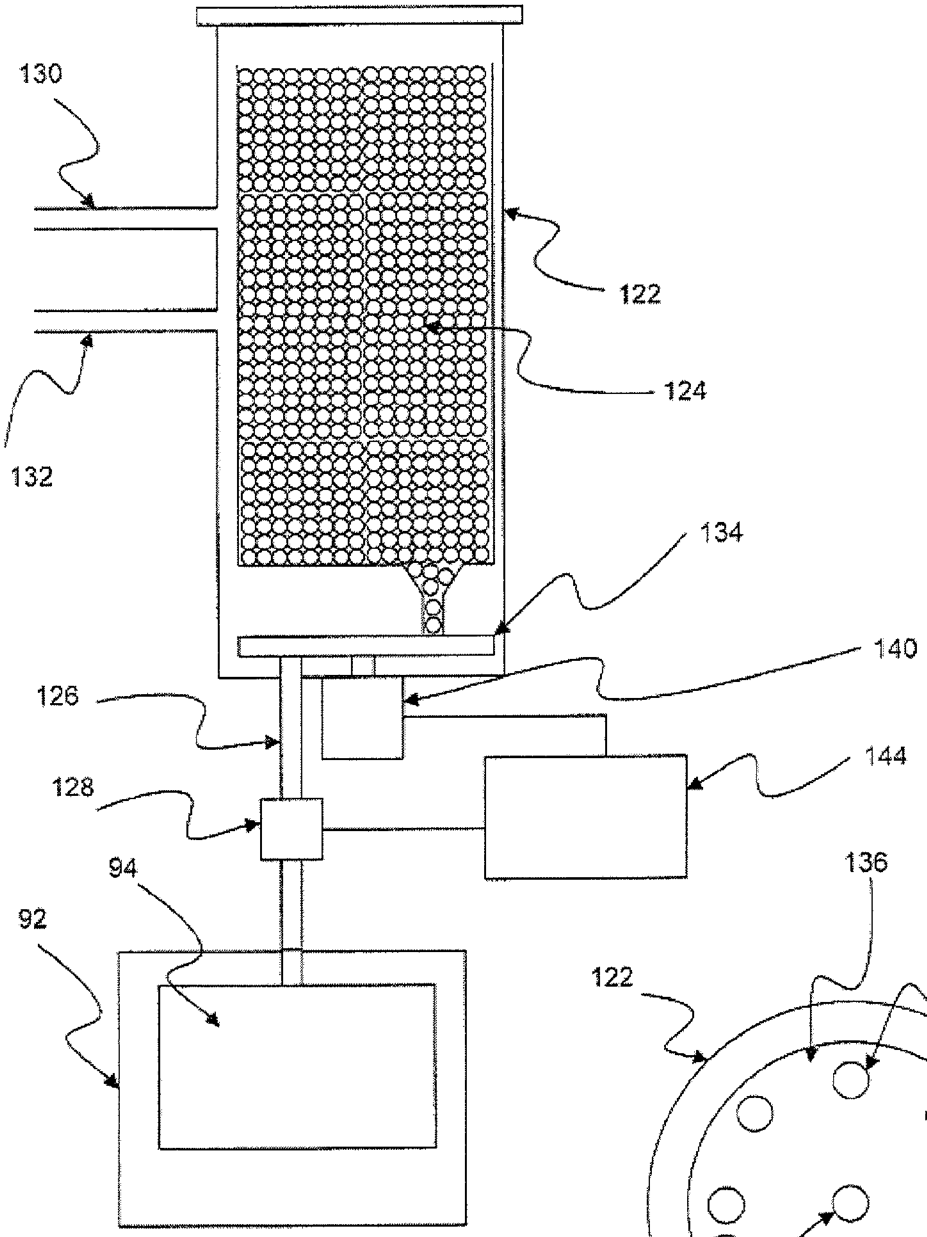
FIGS. 8A and 8B are plan views of a droplet dispenser according to another aspect of the present invention.
Figure 8B:
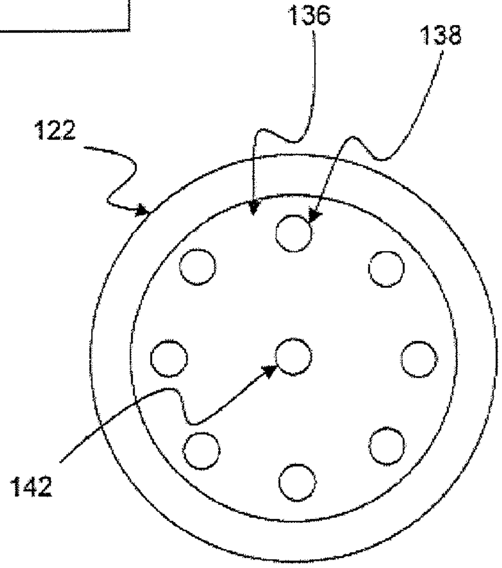

As shown in FIGS. 8A and 8B, according to another aspect of the invention, a system for replenishing target material may include a hopper 122 which can be refilled with pellets 124 of target material. The hopper 122 may be connected to the droplet generator reservoir 94 by a delivery line 126 that includes an in-line isolation valve 128. The hopper 122 may be filled while the isolation valve 128 is closed. The droplet generator 92 may then be refilled using the following series of operations.

A vacuum line 130 connected to the hopper 122 is opened. While the vacuum line 130 is open, an inert gas supply line 132 connected to the hopper 200 is opened as well. This results in a purge which flushes impurities out of the hopper 122.

The vacuum line 130 is then turned off and the pressure in the inert gas supply line 132 is increased to match the pressure in the droplet generator reservoir 94. The isolation valve 128 is then opened and the pressure in the hopper 122 increased to a level slightly higher than the pressure in the droplet generator reservoir 94. Pellets 124 in the hopper 122 are then channeled into a dispensing mechanism 134 in the hopper 200 which dispenses one of the pellets 124 into the delivery line 126.

In the embodiments shown in FIGS. 8A and 8B, the dispensing mechanism and 134 is configured as a disk 136. The disc 136 is provided with at least two apertures 138 dimensioned to receive one of the pellets 124. In the exemplary embodiment shown in FIG. 8B the disk 136 is provided with eight equally spaced circumferential apertures 138. One of ordinary skill in the art will readily appreciate, however, that other numbers and arrangements of apertures 138 could be used as well. The disc 136 is rotated so that each of the apertures 138 moves from a first position at which it receives a pellet 124 to a second position at which the pellet 124 enters the delivery line 126. The disc 136 is preferably rotated by a motor 140 having a shaft 142 coupled to the disk 136. The motor 140 is controlled by a controller 144 which can also control operation of the valve 128. The frequency at which the dispensing mechanism 134 dispenses the pellets 124 may be controlled by a target material consumption algorithm implemented by the controller 144.

Figure 9:
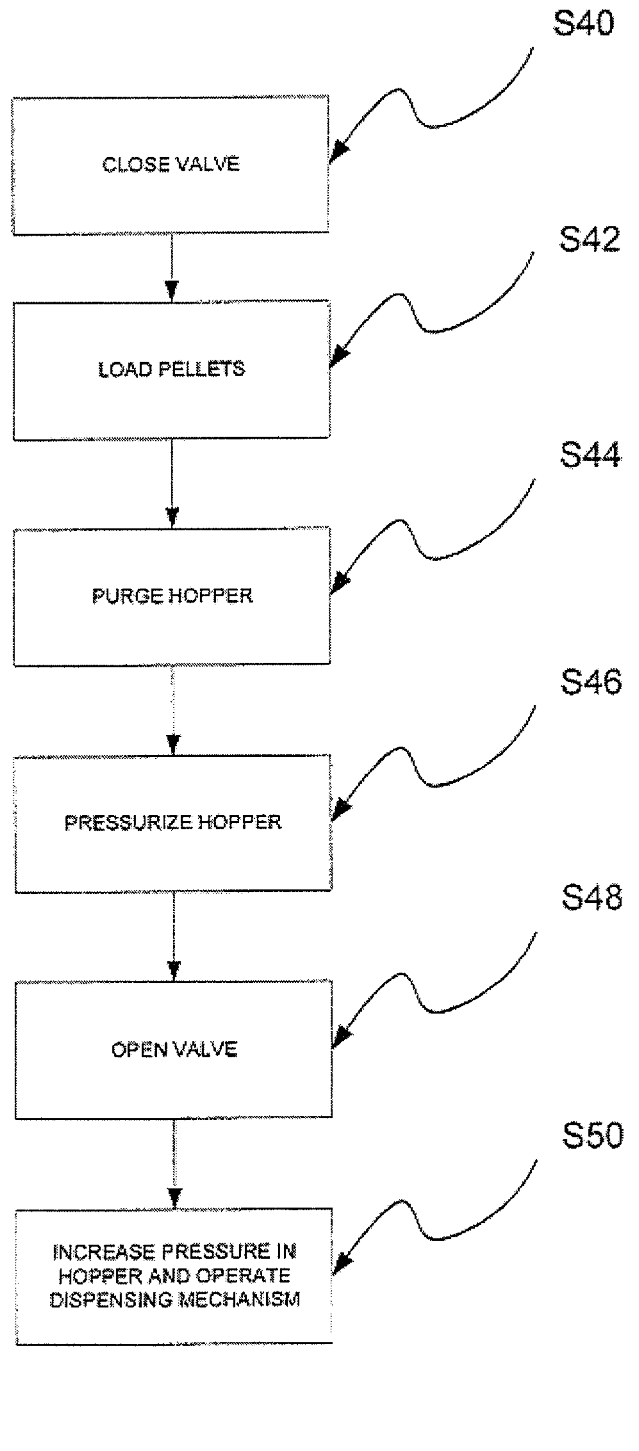
FIG. 9 is flow chart showing the steps of a loading a droplet generator such as that shown in FIGS. 8A and 8B.

With reference now to FIG. 9, the steps for loading target material in an arrangement such as that shown in FIGS. 8A and 8B can be as follows. Initially, the valve 128 is closed in a step S40. The hopper 200 is then loaded with pellets 124 in a step S42. The hopper 202 is then purged as described above in a step S44. The hopper 200 is then pressurized in a step S46. The valve 128 is then opened in a step S48. In a step S50, the pressure in the hopper 200 is increased to level above the pressure in the delivery line and the dispensing mechanism is operated to deliver pellets two of the delivery line.

In a preferred embodiment, the pellets 124 are substantially spherical. The apertures 138 are shaped and dimensioned to receive one of the pellets 124.

The hopper 200 is dimensioned to receive a sufficient number of pellets 124 to avoid the need for frequent refilling but not so many pellets 124 that the mass of the droplet generator 92 is increased to the point of making steering more difficult.

There also technical challenges with recovering target material that has not been vaporized in the vacuum chamber 26. Again using molten tin as an example, a catcher module is typically used to catch the tin. The catcher module will eventually fill up with molten tin. It is desirable to be able to drain the target material from the catcher module without the need for disassembly of the catcher module and while maintaining the catcher module at a low working pressure. Thus, it is desirable to provide a valve which will permit extraction of the tin without breaking vacuum. Because tin in the molten state is very reactive to essentially all metals, it is necessary to develop a valve which permits isolation of the vacuum chamber 26 and the atmosphere that can withstand the corrosive effects of tin.

Figure 10A:
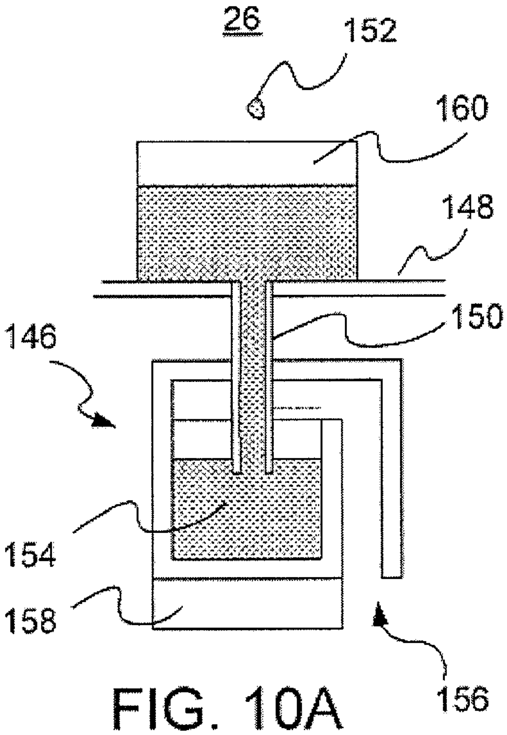
FIGS. 10A, 10B, and 10C are partially cutaway plan views of a system for removing deployed but unvaporized target material in a system such as that shown in FIG. 1.
Figure 10B:
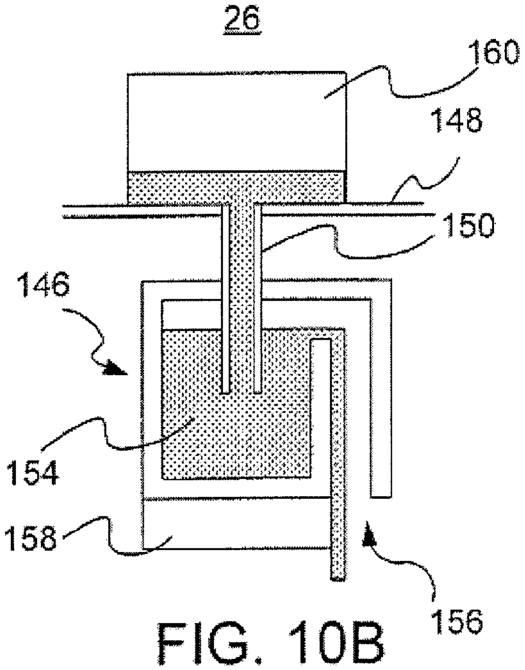
Figure 10C:
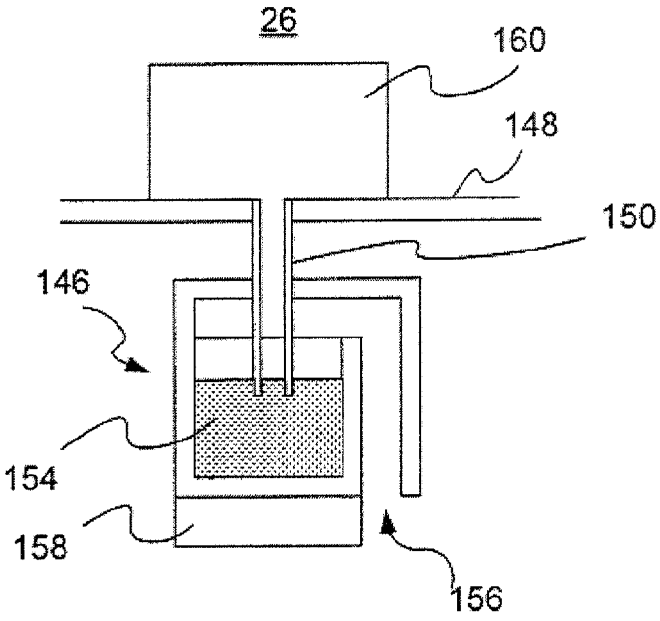

With reference to FIG. 10, according to another aspect of the invention, the system includes a catcher module 146 which is configured to perform a valving action for the removal of target material will maintaining isolation between the vacuum in chamber 26 and the atmosphere. The catcher module 146 is incorporated into a bottom surface 148 of the chamber 26 at a position where an inlet port 150 will receive droplets 152 of target material which have passed through the irradiation region 28 but have not been vaporized. The inlet port 150 extends into a cavity 154 in the catcher module 146.

The cavity 154 is configured so that so that residual target material is always present between the bottom of the inlet port 150 and an outlet port 156, i.e., some amount of target material is always retained in the cavity 154 that separates the bottom of the inlet port 150 and the outlet port 156. As the draining operation completes, the catcher module 146 is cooled by a cooling element 158. The change in density associated with the target material's phase change causes the target material volume in the cavity 154 to reduce and target material around the end of the inlet port 150 will contract resulting in a tight vacuum seal isolating the inlet port 150 and the outlet port 156. A new draining operation is commenced by discontinuing operation of the cooling element 158 so that target material in the cavity 154 becomes molten and fluid communication is re-established between the inlet port 150 and the outlet port 156. The amount of target material extracted in a given operation should be great enough that the extraction operation need not be performed too often, but small enough that there is always target material present between the bottom of the inlet port 150 and the outlet port 156.

In a presently preferred embodiment, the inlet port 150 is preferably configured as a cylindrical tube. The cavity 154 preferably has a cylindrical cross section. The outlet port 156 also preferably has a cylindrical cross section. In the embodiment shown, the outlet port 156 is integral with the cavity 154 but other arrangements are possible.

The above description includes examples of multiple embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An EUV light source target material handling system comprising a target material delivery system adapted to deliver target material to an irradiation region of an EUV light source and a target material supply system adapted to supply target material to said target material delivery system, said target material delivery system comprising
  a target material reservoir;
  a nozzle in fluid communication with said target material reservoir; and a heater arranged to be capable of maintaining said nozzle above a temperature sufficient to keep target material in the nozzle in liquid form;
said target material supply system comprising a repository for holding target material;

said target material handling system further comprising a target material transfer system interposed between said target material reservoir and said repository and adapted to selectively establish a pathway for transfer of said target material from said repository to said target material reservoir, said target material transfer system further including a flexible line between the repository and the target material reservoir to permit the target material delivery system to be moved independently of the repository.

2. The system of claim 1 wherein said target material transfer system comprises a valve to selectively establish a pathway for transfer of said target material from said repository to said target material reservoir and to selectively isolate the repository from the droplet generator plasma source material reservoir.

3. The system of claim 1 wherein the repository is adapted to receive a quantity of target material in solid form, and wherein the target material handling system includes a heater to cause solid target material in said repository to become liquid target material.

4. The system of claim 1 wherein said target material transfer system further includes a heat actuated valve between the repository and the target material reservoir.

5. An EUV light source target material handling system comprising a target material delivery system adapted to deliver target material to an irradiation region of an EUV light source and a target material supply system adapted to supply target material to said target material delivery system, said target material delivery system comprising
  a target material reservoir;
  a nozzle in fluid communication with said target material reservoir; and a heater arranged to be capable of maintaining said nozzle above a temperature sufficient to keep target material in the nozzle in liquid form;
said target material supply system comprising a first repository and a second repository for holding target material;

said target material handling system further comprising a target material transfer system interposed between said target material reservoir and said first repository and said second repository adapted to selectively establish a pathway for transfer of said target material from said first repository and said second repository to said target material reservoir.

6. The system of claim 5 wherein said target material transfer system comprises a valve to selectively establish a pathway for transfer of said target material from said first repository to said target material reservoir and to selectively isolate the first repository from the target material reservoir.

7. The system of claim 5 wherein the first repository is adapted to receive a quantity of target material in solid form, and wherein the target material handling system includes a heater to cause solid target material in said first repository to become liquid target material.

8. The system of claim 5 wherein the second repository is adapted to receive a quantity of target material in solid form, and wherein the target material handling system includes a heater to cause solid target material in said second repository to become liquid target material.

9. The system of claim 5 wherein the first repository and second repository are respectively adapted to receive a quantity of target material in solid form and wherein the target material handling system includes a first heater to cause solid target material in said first repository to become liquid target material and a second heater to cause solid target material in said second repository to become liquid target material.

10. The system of claim 9 wherein the target material handling system is adapted to have a first state in which said first repository is in fluid communication with said target material reservoir and said second repository is not in fluid communication with said target material reservoir, and a second state in which said first repository is not in fluid communication with said target material reservoir and said second repository is in fluid communication with said target material reservoir.

11. The system of claim 5 wherein said target material transfer system further includes heat actuated valve between the first repository and the target material reservoir.

12. The system of claim 5 wherein said target material transfer system further includes heat actuated valve between the second repository and the droplet generator plasma source material reservoir.

13. The system of claim 5 wherein said target material transfer system further includes a flexible line between the first repository and the reservoir to permit the target material delivery system to be moved independently of the first repository.

14. The system of claim 5 wherein said target material transfer system further includes a flexible line between the second repository and the reservoir to permit the target material delivery system to be moved independently of the second repository.

15. An EUV light source target material handling system comprising a target material delivery system adapted to deliver target material to an irradiation region of an EUV light source and a target material supply system adapted to supply target material to said target material delivery system, said target material delivery system comprising a target material reservoir;

a nozzle in fluid communication with said target material reservoir; and a heater arranged to be capable of maintaining said nozzle above a temperature sufficient to keep target material in the nozzle in liquid form;

said target material supply system comprising a repository for holding target material in the form of pellets; the repository including a dispensing mechanism for dispensing the pellets one at a time into the pathway, the dispensing mechanism comprising an element with structure defining a plurality of apertures each dimensioned to receive one of said pellets and a mechanism mechanically coupled to said element so as to sequentially move each of said apertures from a first position wherein one of said apertures receives a pellet from said repository and a second position wherein said pellet is released from the aperture into said pathway;

said target material handling system further comprising a target material transfer system interposed between said target material reservoir and said repository and adapted to selectively establish a pathway for transfer of said pellets from said repository to said target material reservoir.

16. The system of claim 15 wherein said target material transfer system comprises a valve to selectively establish a pathway for transfer of said target material from said repository to said target material reservoir and to selectively isolate the repository from the droplet generator plasma source material reservoir.

17. An EUV light source target material handling system comprising: a target material delivery system adapted to deliver target material to an irradiation region of a vacuum chamber of an EUV light source; and a target material recovery system in a wall of said vacuum chamber and arranged to receive spent target material that has passed through said irradiation region without being irradiated, said target material recovery system comprising a first port in fluid communication with an interior of said vacuum chamber and arranged to receive said spent target material, a second port in fluid communication with an exterior of said vacuum chamber, a cavity between said first port and said second port for retaining spent target material, and a temperature controller for causing the cavity to have a first temperature state in which solid spent target material in the cavity seals the first port from the second port, and a second temperature state in which liquid spent target material in the cavity flows from the first port and out the second port through the cavity.

* * * * *